United States Patent [19]

Noirel

[11] 4,420,833
[45] Dec. 13, 1983

[54] UNIDIRECTIONAL DATA TRANSMISSION SYSTEM

[75] Inventor: Yves M. Noirel, Montfort, France

[73] Assignees: Etablissement Public de Diffusion dit "Telediffusion de France" ; L'Etat Francais, represente par le Secretaire d'Etat aux Postes et Telecommunications et a la Telediffusion

[21] Appl. No.: 189,080

[22] Filed: Sep. 22, 1980

[30] Foreign Application Priority Data

Sep. 27, 1979 [FR] France ............................... 79 24570

[51] Int. Cl.³ ............................................... H04J 3/16
[52] U.S. Cl. ....................................... 370/83; 370/82; 358/142; 358/147
[58] Field of Search ............................ 370/83, 82, 79; 358/142, 147

[56] References Cited

U.S. PATENT DOCUMENTS

| | | | |
|---|---|---|---|
| 4,071,887 | 1/1978 | Daly et al. | 370/83 |
| 4,115,662 | 9/1978 | Guinet et al. | 370/83 |
| 4,168,469 | 9/1979 | Parikh et al. | 370/83 |

FOREIGN PATENT DOCUMENTS 2069799 8/1981 United Kingdom .................. 370/79

Primary Examiner—Douglas W. Olms
Attorney, Agent, or Firm—Laff, Whitesel, Conte & Saret

[57] ABSTRACT

A system broadcasts videotext data in the form of data packets originating from numerical data coming from several paths. Each packet has a prefix which contains synchronization and path identification code signals, a format signal which indicates the length of the data which follow the prefix. The transmitting station has as many coupling devices as there are paths for originating data. The coupling device has a data memory coupled to drive to a multiplexing circuit under the control of a common governing circuit. An inhibition order is given either as soon as the memory is full, or as soon as a counter has reached a pre-determined count. Then, the memory is connected to the multiplexing circuit, into which the stored data is emptied. The system is characterized in that a small capacity buffer is used between the memory and the input circuit for reading data out of the buffer memory responsive to a programmer. A transcoder treats the broadcast data to fit it into the system format.

2 Claims, 6 Drawing Figures

PROGRAMMER OR MEMORY CIRCUIT 171

TRANSCODER CIRCUIT 191

UNIDIRECTIONAL DATA TRANSMISSION SYSTEM

The present invention relates to modifications, changes and improvements in the unidirectional data transmission system described in French Patent Application No. 75 18319 (now U.S. Pat. No. 4,115,662) first applied for in France on June 6, 1975, in the joint names of the applicants, and in the First Certificate of Addition Certificate No. 77 17625 (now U.S. Pat. No. 4,317,132) first applied for in France on June 3, 1977.

In the unidirectional or broadcast data transmission system of the Main Patent and of the First Certificate of Addition indicated above, the transmitted data are arranged in packets, each packet having, at most, the active duration of a line of television image. The packets are inserted either in place of the image signals or in place of the scan return lines, i.e. between the conventional synchronization signals of television lines.

Each packet which is broadcast begins with a prefix containing, the synchronization signals or conventional binary elements and of octets (i.e. eight bit words) and the path identification code signals. A packet format signal indicates the length of the succession of data, which follows the prefix. More specifically, in the data packet, the useful data and the prefix-composing data are grouped into octets. Therefore, the format signal is an octet which indicates the number of octets of useful data which follows the prefix.

The tests carried out with the transmission system, according to the above-defined system, and using as transmission support a public broadcast network, have shown that it was necessary to protect the data packet against transmission errors, the same conclusion being valid for the informations contained in the prefix. As the data packet is formed of octets, it proves especially simple to provide for a protection against errors and for an error correction, octet by octet. It is then normal to adopt an octet structure conforming to a Hamming code, that is to say a structure in which, for example, the binary elements b1, b3, b5 and b7 are reserved for the correction of errors, while the binary elements b2, b4, b6 and b8 carry the data.

In order not to unduly extend the prefix, it will be seen that a single format octet comprising only four useful binary elements, can serve to count only to 16. Now, the number of the octets which follow a prefix may, as described in the above-indicated applications, exceed that value by much.

One object of the present invention is to provide for a system which makes it possible, through the use of a pre-determined convention, to use only a single format octet, in each data packet prefix, the format octet comprising four information carrying binary elements and four binary elements for the correction of possible errors in transmission, for useful data packets comprising more than sixteen octets and, especially, up to fifty-one useful octets.

According to a characteristic of the present invention, a data broadcast system includes the emitting station broadcasts in the form of data packets, each packet comprising a prefix containing, in addition to the usual synchronization signals and path identification code, a packet format signal which indicates the length of the succession of data which follows the prefix. The emitting or sending station comprises as many coupling devices as there are paths, each coupling device comprising an input circuit having an input which is connected to the output of the path associated with the coupling device. The output of the coupling device is connected to a data memory, the output of which can be connected to a multiplexing circuit under control of a governing circuit which is common to all of the coupling devices. A counter is fed at a pre-determined clock rate or rhythm. The inhibition order of the input circuit is given either as soon as the memory is full or as soon as the counter has reached a pre-determined count. Thereafter, the memory is connected to the multiplexing circuit, and then emptied. The counter is set back to zero and the inhibition order is eliminated. A register has an adjustable maximum capacity causing or governing the inhibition order when the count of the data reaches a pre-determined value. Between the memory and input circuit, there is a buffer memory of small capacity. The reading of the buffer memory data is governed by a programmer.

According to another characteristic, a receiving equipment of the data diffusion system, uses the signals which follow the prefix, when the latter is accepted in it. These signals are sent to a buffer memory, the output of which is connected to an output circuit, with a format signal register which stores the format signal of each prefix of each data packet received. A counter is fed by a clock signal at the frequency of the octets which, when it reaches a maximum count, empties the sequence of data from the buffer memory into the output circuit. The length of the sequence is limited by the content of the format register. The format register is fed by a transcoding circuit which treats the broadcast format signal.

The above-indicated characteristics of the present invention, as well as others, will appear more clearly from the reading of the following description of an embodiment. The description being given relative to the attached drawing in which.

Figure 1:
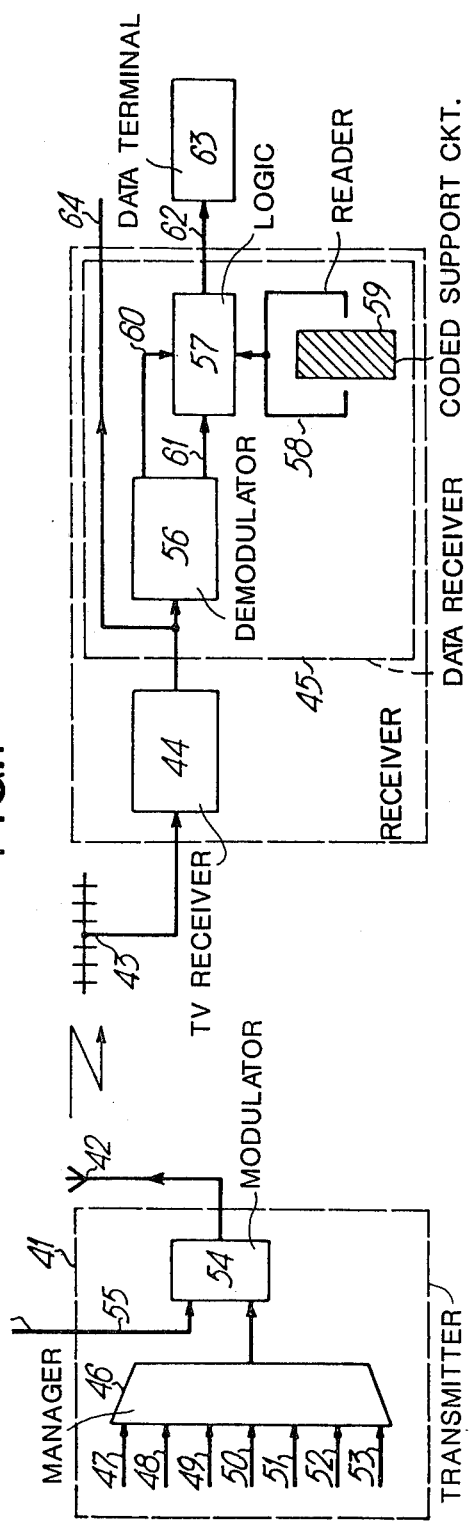
FIG. 1 represents the block-diagram of a data broadcast system in which the improvements according to the present invention are incorporated.

The data broadcast system in FIG. 1 comprises a transmitting or sending station which has transmission equipment 41 and an antenna 42, as well as a plurality of subscribers receiving stations, each having a reception antenna 43, a television receiving set 44 and a data receiving equipment 45.

The transmitting equipment 41 comprises a unit 46 called "manager", which is responsive for time multiplexing the data messages coming from a plurality of data sources which, in the described example, is assumed to be limited to seven sources 47 to 53. Equipment 41 further comprises a modulation part 54 which receives, for one part, the signals transmitted by the manager circuit 46, and, for the other part, video signals received through a connection 55, and which transmits signals to a conventional transmitting device, not shown, which feeds antenna 42. As an example, a description of a modulation part 54, which is not part of the present invention, is found in the Main Patent Application No. 75 18319 (U.S. Pat. No. 4,115,662), already cited and, especially, with respect to FIG. 4 of such patent.

The data transmitted by the manager 46 are arranged in packets. In the modulation part 54, the data packets are inserted in place of image signals, between the conventional synchronization signals of the television lines.

Figure 2:
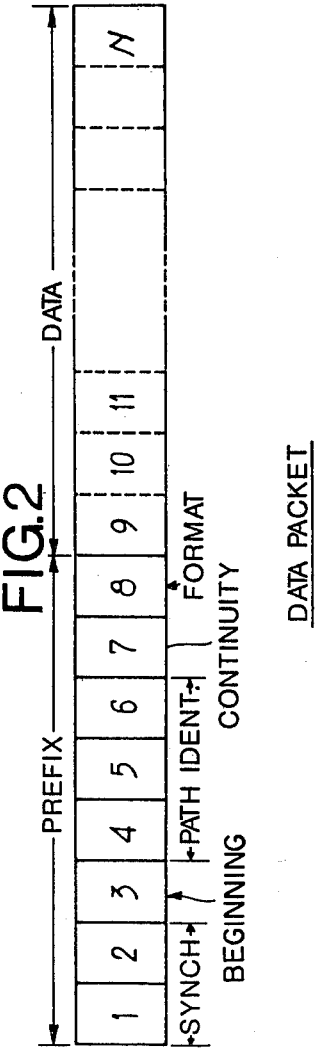
FIG. 2 is a diagram of data packets making it possible to illustrate the functioning of the system in FIG. 1.

FIG. 2 shows an example of data packets transmitted by manager 46, and then, after modulation, by antenna 42.

The data packet has a length of N octets which are numbered from 1. to N, and it is composed of two parts. The first part, called prefix, is prepared under control of manager 46 and is constituted, in the example represented, by the first eight octets 1. to 8. The second part of FIG. 2, constituted by octets 9 to N, with $N-9=M$, constitutes the real data of the data packet. The number N always remains inferior to a number Nmax which may vary, depending on the standard of the television network which ensures the broadcast. The number N may be determined by optimizing, taking into account the length of the useful television line and of the passing band. Thus, in the French TV broadcast standard with 625 lines, Nmax may reach 40, this corresponding to the L standard recommended by the CCIR.

In the prefix, the octets 1 and 2 are reserved for synchronization of the binary elements of the data packet. They are each composed of the sequence of binary elements 10101010. Octet 3, called "beginning", conventionally makes it possible to perform the synchronization octet by octet and it may correspond to the sequence 11100111. Octets 4, 5 and 6 are reserved for the identification of the numerical path, and they are prepared in coded form by the manager 46. Octet 7, called the "continuity" octet makes it possible to count the numbers or the indices of packets or of errors in the receiving equipment. Finally, octet 8 indicates the "format" of the packet, that is to say the number of octets M which follow the prefix to form the packet.

With reference again to FIG. 1, the television receiver 44 transmits, through its video output, the video signals of the equipment 45. The latter comprises a demodulating part 56, a logical part 57 and a signal of binary elements frequency (bits) sent through 60 and the last bit $(N-3) \times 8$ of the N octets sent through data packet 61. The informations read by reader 58 are permanently applied to a reception logic circuit 57. With respect to the role of coded support circuit 59, it will be useful to refer to the Main Patent Application (U.S. Pat. No. 4,115,662). The reception part 57 delivers in 62 the data octets of the packets, through a suitable terminal, such as 63, while the video signal delivered by receiver 44 still is available in 64.

Figure 3:
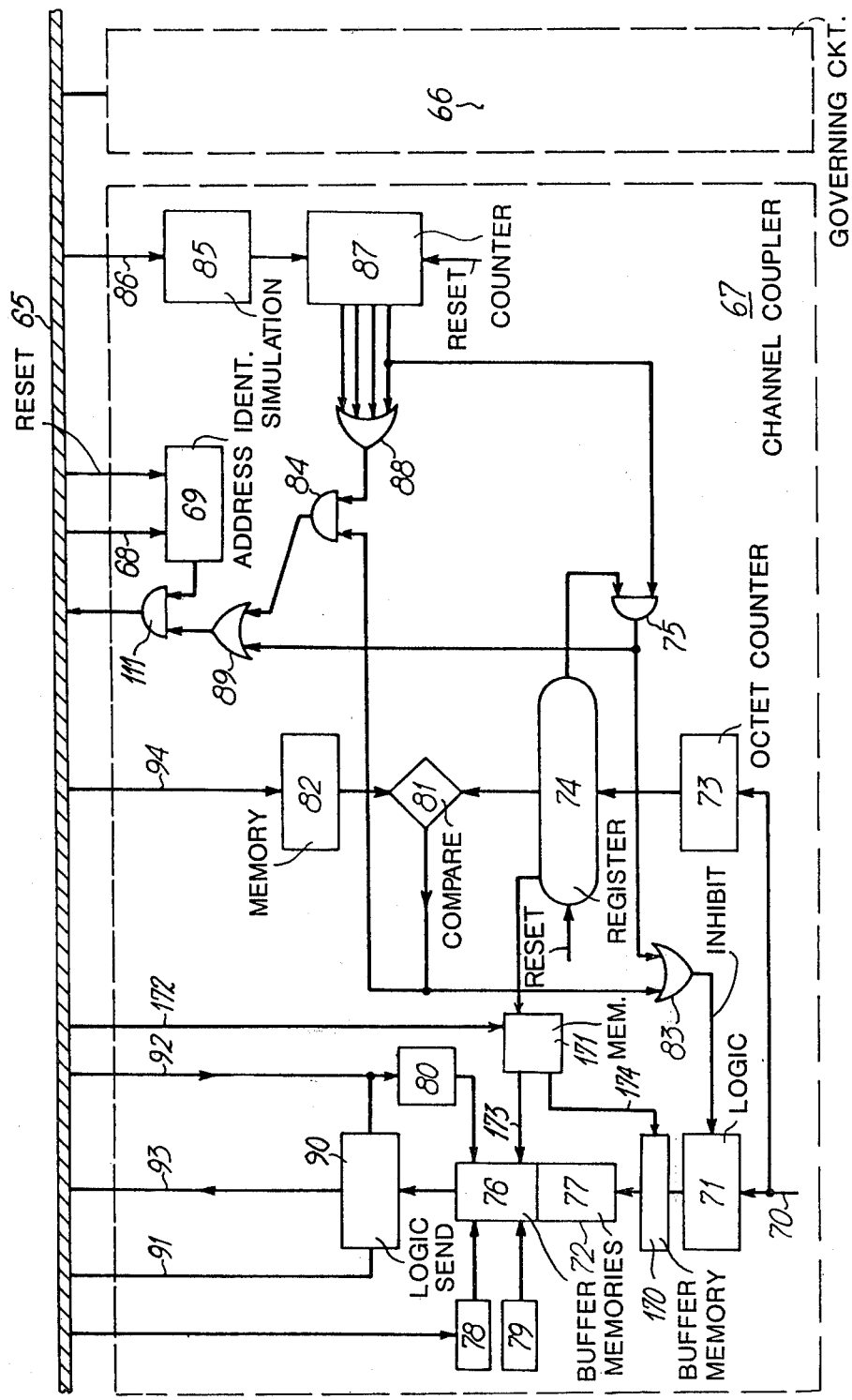
FIG. 3 is a block-diagram of the logical part of the transmission equipment.

FIG. 3 shows a data bus line 65, a governing circuit 66 and one of a plurality of coupling agents 67, for connecting sources 47 to 53, to line 65. In practice, data bus line 65, circuit 66 and coupling agents 67 constitute manager 46, FIG. 1. The governing circuit 66 is connected by bus 65 and it may govern coupling agents 67 and be connected by bus 65. Circuit 66 will not be described in detail because it is identical to circuit 76 in FIG. 3 of the Main Patent Application (U.S. Pat. No. 4,115,662). There will only be recalled from this patent that circuit 66 sends in the form of addresses, questions to the coupling agents, in order to collect the identities of the coupling agents which may be ready to emit. Then, it sends in successions transmission orders toward those coupling agents.

In coupling agents 67, the interrogations coming from governing circuit 66 enter through connection 68 which is connected to an address identification circuit 69 comprising components 90, 92 and 126 in FIG. 3 of the Main Patent Application (U.S. Pat. No. 4,115,662). Circuit 69 has its outlet connected to the first input of an AND gate 111, the output of which is connected to bus 65.

The data coming from the source associated with coupling agent 67 are transmitted by a junction 70 of the type described in the French patent application No. 2 268 308, the title of which is "Standardized Interface Communications Device." Through juncture 70, the data enter, in parallel octets, into a logical circuit the input of which is 71 and the output of which is connected to an intermediary buffer memory 72. In addition, the "going" service wire of connection 70, which transmits a change of state for each octet transmitted by 70, is connected to the input of an octet counter 73, the output of which is connected to a register 74 which contains the number of octets transmitted by logic circuit 71 to the intermediary buffer memory 170. Register 74 has a reset or setting back to zero input connected to data bus line 65, an output connected to the first input of an AND gate 75, and an output connected to the input of a memory counter 171. Counter 171 has a governing input connected, through a connection 172, to bus line 65, and its output is connected to memory 72.

Buffer memory 72 comprises two parts, one, 76, in which are registered the octets of the packet prefix and the other, 77, in which are registered the data octets coming from the source through 71 and 170. Part 76 has a first input connected to a memory 78 which contains the octets 1 to 3, the synchronization and 'start' octets, a second input connected to a memory 79 which contains the three octets 4 to 6 for the identification of each packet prefix, a third input connected to a packet counter 80 which delivers the number of the packet, that is to say the continuity octet, and a fourth input connected to counter 171 which delivers, at the time of transmission, the number of octets contained in part 77, that is to say the format octet.

An output of register 74 also is connected to the first input of a comparing device 81, the second input of which is connected to the output of a memory 82 containing the number $Mmax=Nmax-8$, which corresponds to the maximum number of the octets of data which can be transmitted in a packet. Output 81 is connected, on one side to an input of an OR gate 83 and, on the other side, to the first input of an AND gate 84. The output OR gate 83 is connected to an inhibition input of circuit 71.

The coupling agent further comprises a simulation circuit 85, which receives a speed indication coming from governing circuit 66 through data bus 65 and a connection 86. The speed indication depends on the speed of functioning of the reception equipments which are capable of receiving the data from the source associated to the coupling agent. With the speed information, simulator 85 simulates emptyings of buffer memory 72. The emptyings are counted in a counter 87 connected to the output of simulator 85. The outputs numbers 1 to 4 of counter 87 are connected to the inputs of an OR gate 88, the output of which is connected to the second input of AND gate 84. In addition, output "4" of counter 87 is connected to the second input of AND gate 75. The outputs of AND gates 75 and 84 are respectively connected to the inputs of an OR gate 89, the output of which is connected to the second input of AND gate 111. The output of AND gate 75 further is connected to an input of the OR gate 83.

The output of memory 72 is connected to a logical send or emission circuit 90 which receives from data bus 65, through connection 91, the frequency signal of the binary elements and, through connection 92, the emission order coming from governing circuit 66. The output of logic send circuit 90 is connected to line 65 through wire 93 which transmits in series, bit by bit, the packet toward the modulation part of the emission equipment. Connection 92 also is connected to the input of counter 80 which, in this way, can count the packet emitted by coupling agent 67.

Circuit 171 has an output connected, through a connection 173, to part 76 of memory 72, and another output connected, through a connection 174, to the reading governing input of buffer memory 170. Memory 170 is a memory the content of which empties into part 77 of memory 72 at the time of each reading order coming from memory 171.

Figure 4:
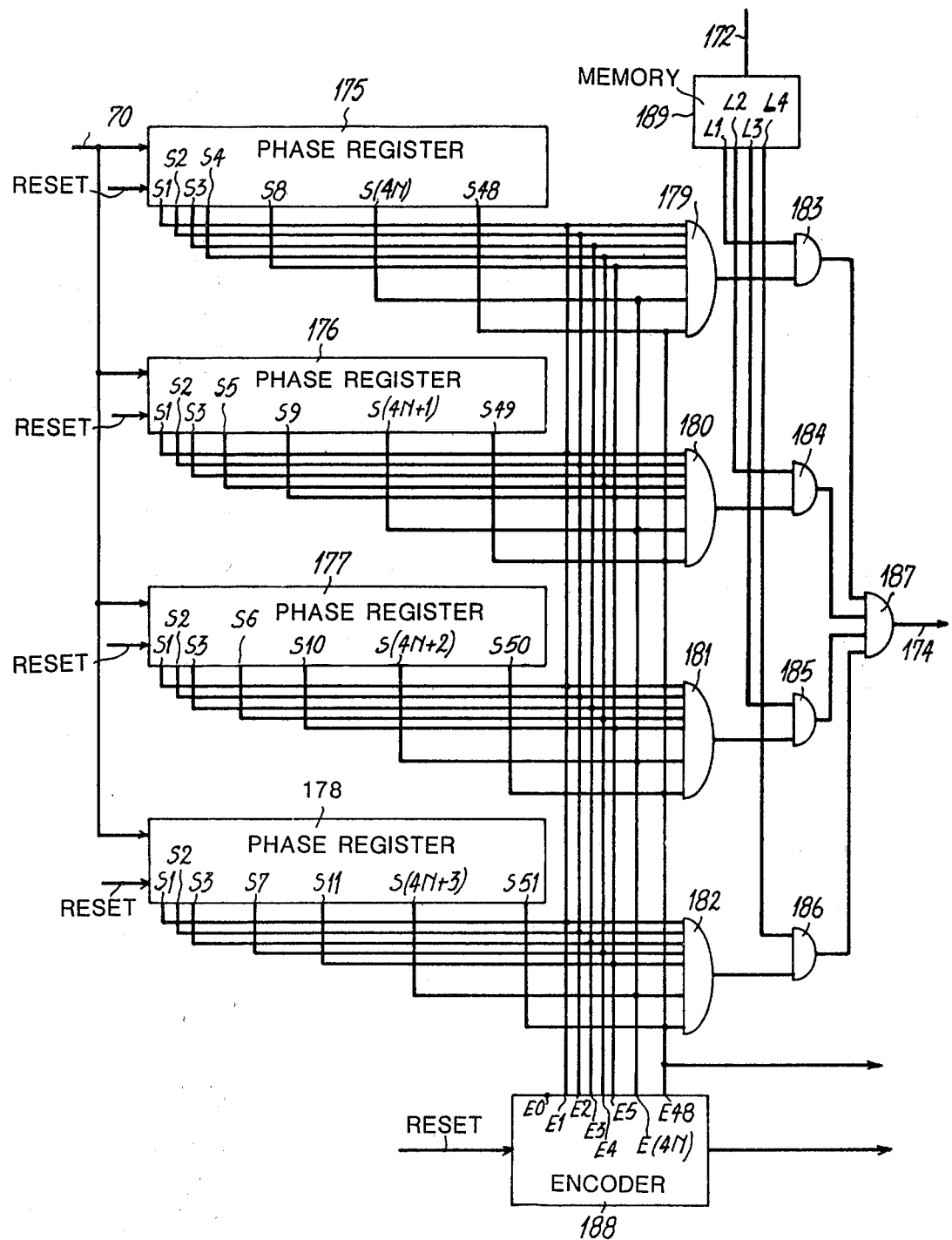
FIG. 4 is a diagram of a counter circuit of a "programmer" or the coupling device in FIG. 3.

A "programmer" or memory circuit 171, shown in FIG. 4, comprises four 'different phase' registers 175 to 178, four OR gates 179 to 182, four AND gates 183 to 186, one OR gate 187, a binary coding circuit 188 and a memory register 189. Registers 175 to 178 are fed in parallel through the "going" service wire of connection 70. Register 175 has its outputs S1, S2, S3, S4, S8, S12, ... S(4N), ... S(48), connected to the inputs of OR gate 179. Register 176 has its outputs S1, S2, S3, S5, S9, ... , S(4N+1), ... S49, connected to the inputs of the OR 180 gate. Register 177 has its outputs S1, S2, S3, S6, S10, ... S(4N+2) ... , S50, connected to the inputs of the OR gate 181. Register 178 has its outputs S1, S2, S3, S7, S11, ... , S(4N+3), ... , S51, connected to the inputs of OR gate 182. Coding device 188 comprises sixteen inputs E0, E1, E2, E3, E4, ... , E(4N), ... , E48. The count input E1 is connected in parallel, to outputs S1 of registers 175 to 178; in a similar manner, the inputs E2 and E3 of coder 183 are respectively connected, in parallel, to outputs S2, and S3 of those registers. Input E4 of coder 188 is connected, in parallel, to outputs S4 of 175, S5 of register 176, S6 of register 177 and S7 of register 178. In the same manner, input EN of coder 188 is connected, in parallel, to outputs S(4N) of register 175, S(4N+1) of register 176, S(4N+2) of register 177 and S(4N+3) of register 178. Coding device 188 transmits, in binary code, through connection 173, the rank of its last activated input, to part 76 of memory 72 (FIG. 3), to form the format octet, at the time of transmission of the data packet from memory 72 to line 65 for broadcasting.

In addition, memory 189 has its data input connected to connection 172, and four outputs L1 to L4 respectively connected to the first inputs of AND gates 183 to 186. Through connection 172, line 65, depending on the order given by the operator of the manager, transmits an order which causes one of outputs L1 to L4 to be marked. The outputs of the OR gates 179 to 182 are respectively connected to the second inputs of AND gates 183 to 186. The outputs of AND gates 183 to 186 are connected to the corresponding inputs of the OR gate 187 the output of which is connected to connection 174 toward the reading input of buffer memory 170 (FIG. 3).

If, for example, it is assumed that output L1 of 189 is marked, at each octet transmitted by buffer memory 170 (FIG. 3) to part 77 of 72, the register with 'phase difference' moves forward. Each time the number of octets thus transmitted corresponds to one of outputs (S1, S2, S3, ... , S(N), ... , S48) of register 175, the OR gate 179 transmits, through the AND gate which has been opened by L1, a signal which, through the OR gate 189, is transmitted to the reading input of memory 170 which empties itself. It therefore appears that the number of octets in the part 77 may be only "0," "1," "2," "3." "4". .., "4N,". ..., or "48." There can therefore be only sixteen values of octet numbers possible in part 77, which coding device 188 can code with four binary elements. If, for example, output L2 of memory 189 is marked, the outputs of register 176 are the ones which determine the reading times of buffer memory 170. There again, the number of those times of reading limits to sixteen the number of the possible values for the numbers of octets in part 77. The result from the above is that as a function of the marked outputs of memory 189, it is possible to make out four lists of octet numbers, indicated in the following Table.

TABLE

| b8 | b6 | b4 | b2 | List 1 L1 | List 2 L2 | List 3 L3 | List 4 L4 |
|---|---|---|---|---|---|---|---|
| 0 | 0 | 0 | 0 | 0 | 0 | 0 | 0 |
| 0 | 0 | 0 | 1 | 1 | 1 | 1 | 1 |
| 0 | 0 | 1 | 0 | 2 | 2 | 2 | 2 |
| 0 | 0 | 1 | 1 | 3 | 3 | 3 | 3 |
| 0 | 1 | 0 | 0 | 4 | 5 | 6 | 7 |
| 0 | 1 | 0 | 1 | 8 | 9 | 0 | 11 |
| 0 | 1 | 1 | 0 | 12 | 13 | 14 | 15 |
| 0 | 1 | 1 | 1 | 16 | 17 | 18 | 19 |
| 1 | 0 | 0 | 0 | 20 | 21 | 22 | 23 |
| 1 | 0 | 0 | 1 | 24 | 25 | 26 | 27 |
| 1 | 0 | 1 | 0 | 28 | 29 | 30 | 31 |
| 1 | 0 | 1 | 1 | 32 | 33 | 34 | 35 |
| 1 | 1 | 0 | 0 | 36 | 37 | 38 | 39 |
| 1 | 1 | 0 | 1 | 40 | 41 | 42 | 43 |
| 1 | 1 | 1 | 0 | 44 | 45 | 46 | 47 |
| 1 | 1 | 1 | 1 | 48 | 49 | 50 | 51 |

For block lengths L ranging from 0 to 3, the lists are identical; above "3," they satisfy the following relationships:

| List 1 | L = 4N |
| List 2 | L = 4N + 1 |
| List 3 | L = 4N + 2 |
| List 4 | L = 4N + 3 |

It can be seen that, considered together, the four above lists make it possible to choose any maximum block size up to a value of "51." Thus, the freedom of choise of the binary element frequency which was acquired through the use of the system described in U.S. Pat. No. 4,317,132 can thus be integrally preserved.

The functioning of coupling agent 67 is practically the same as that of U.S. Pat. No. 4,317,132, except with respect to circuits 170 and 171.

Before the sending of information coming from a particular source, the decision is reached to set the maximum length of the data blocks, this determining list 1, 2, 3 or 4 which is going to be used. The operator then has sent through data busses 65 and 172, the order to mark the corresponding output in memory 189 (FIG. 4). One of the AND gates 179 to 182 is switched on to read the orders of the corresponding register to buffer memory 170.

Moreover, the operator causes the recording, in memory 82, of the number representing the maximum size chosen.

It is known that memory 72 (FIG. 3) empties itself toward data bus 65 when the emission of the packet is authorized and one of the following conditions presents itself. Either the number of octets introduced into memory 77 is equal to the maximum value written in memory 82, or the simulator 85 has caused counter 87 to pass to position "4" before the maximum number has been reached. In both cases, circuit 71 stops transmission on connection 70 because its governing input is inhibited by OR gate 83. There may be any number of octets, between 0 and 4, in buffer memory 170; they remain there to be transferred into memory part 77 on the occasion of the formation of the following data packet. Registers 175 to 178 are set back to zero by their RESET inputs at each transmission of a data packet.

It must further be noted that the operator of the source associated with the coupling agent under consideration always transmits only significant data, and that it does not have to worry about either the maximum number, or the transmission frequency of the binary elements.

Figure 5:
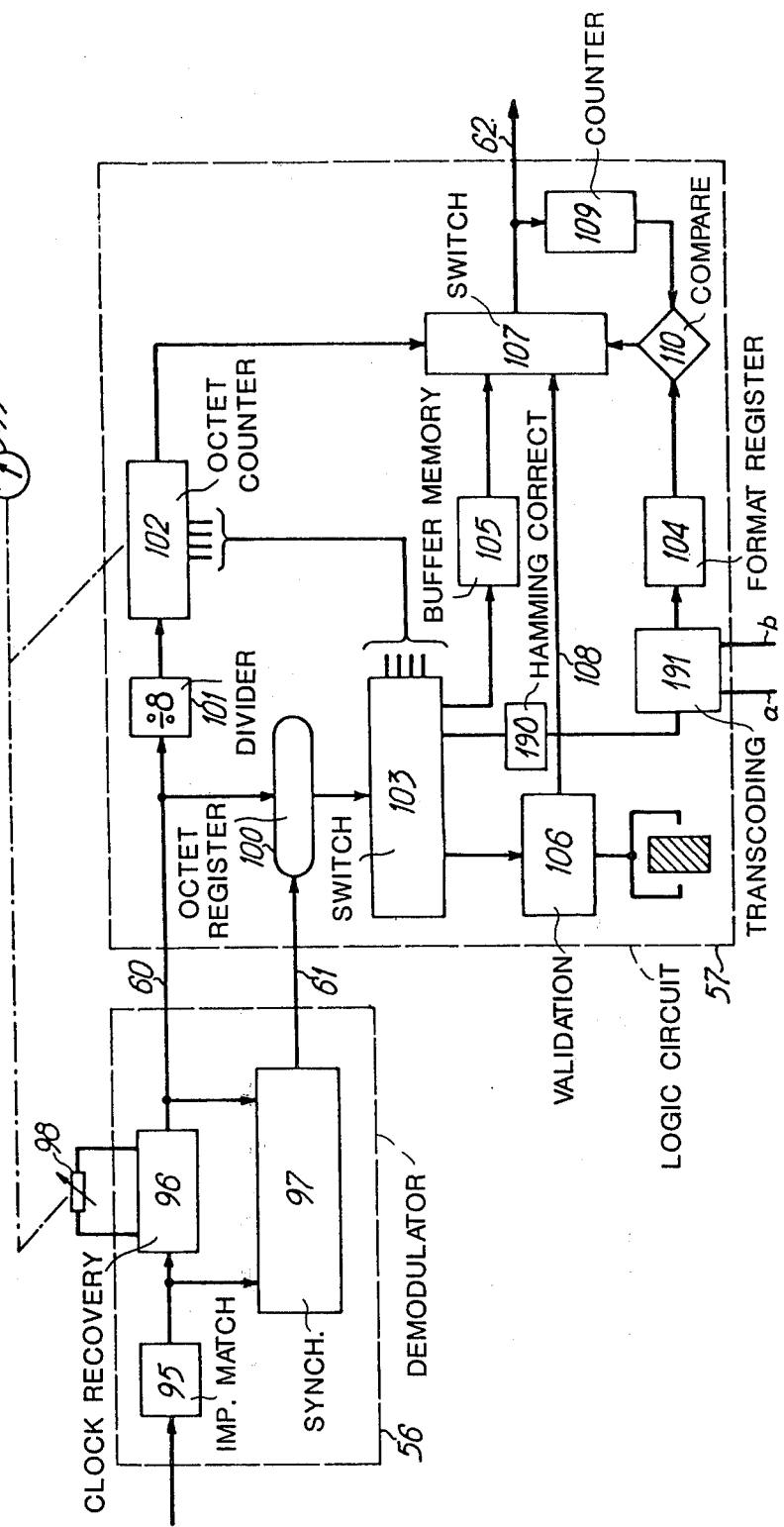
FIG. 5 is a block-diagram of a data receiving equipment.

The demodulation part 56 of subscriber reception equipment is represented in FIG. 5. The video signals coming out of the television receiver 44 are applied to an impedance matching circuit 95, the output signal of which is applied, on one side to a clock recovery circuit 96 for the recovery of the binary element frequency and, on the other side, to a synchronization circuit 97. Synchronization circuit 97 is the same as circuit 97 in FIG. 5 of the U.S. Pat. No. 4,115,662. It recognizes, especially, the starting octet so that it will transmit to the logic circuit 57, via connection 67, only the fourth octet of each data packet and the following octets. Circuit 96 comprises, as do the conventional circuits for the recovery of the clock rate or binary element frequency, a tuned circuit comprising a variable impedance component 98, which may be a varycap, the impedance of which is governed by the television channel selector 99. Circuit 96 delivers the clock rate or binary element frequency signal on one side to synchronization circuit 97 and, to the other side, to logic circuit 57 through connection 60.

In circuit 57, the signal at the frequency of the bits is applied, on one side to an octet register 100 and, on the other side, to a divider by eight 101 the output of which is connected to the input of an octet counter 102. The bits of the data packet are applied by wire 61 to the data input of octet register 100 which transmits the octets in parallel to a switching circuit 103. Octet counter 102 has its first six outputs which correspond to the first six octets received in 57, that is to say to octets 4 to 9, connected to governing inputs of switching circuit 103, the inputs of which are activated in succession. Switching circuit 103 orients, in succession, the octets of the data packets which are transmitted toward validation circuit 106 for octets 4, 5, 6 and 7, toward a Hamming correction circuit 190 for octet 8, and toward a data buffer memory 105 for the following octets. The output of the Hamming correction circuit 190 is connected to the input of a transcoding circuit 191, the output of which is connected to format register 104.

Figure 6:
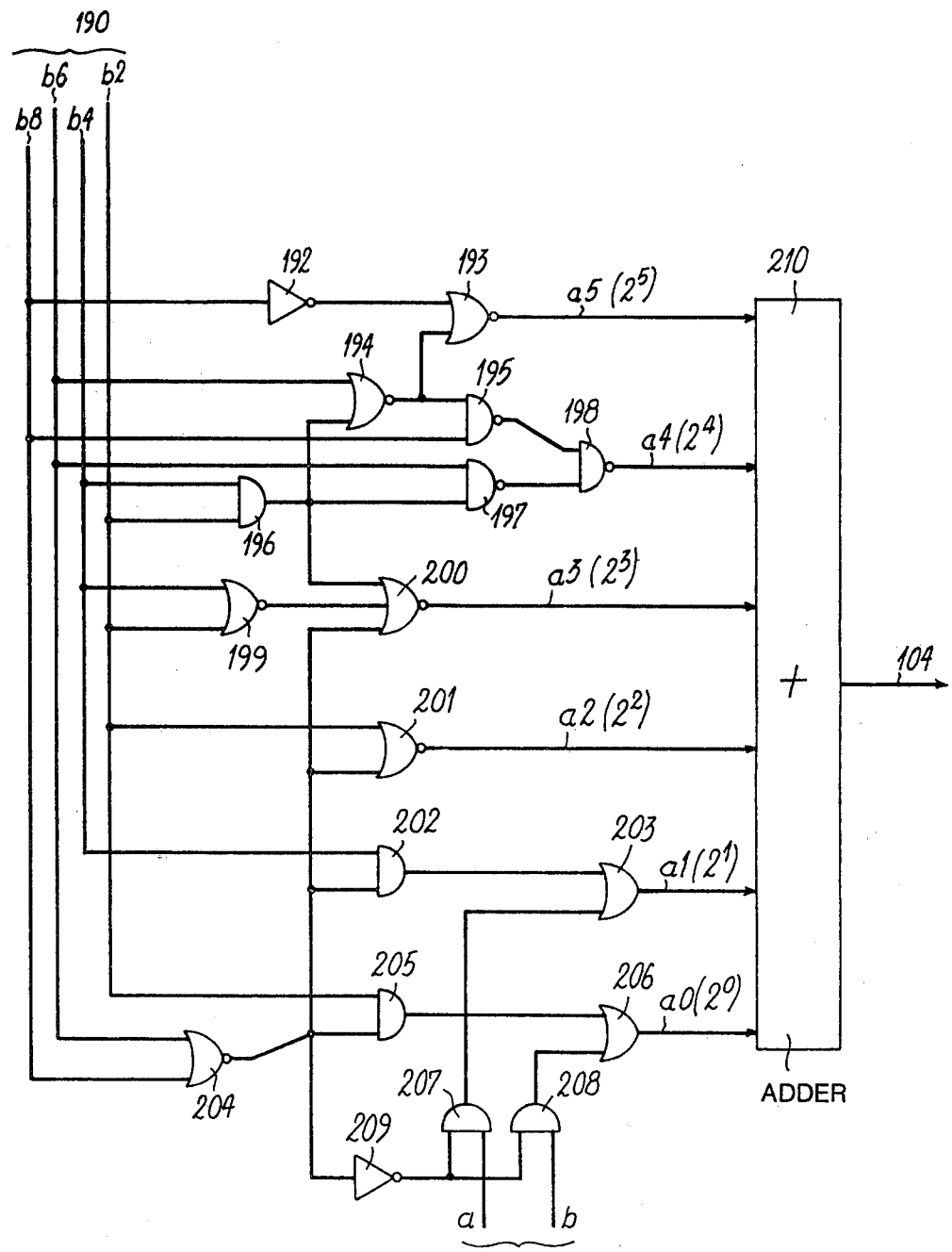
FIG. 6 is a diagram of a transcoding circuit of the receiving equipment in FIG. 5.

Validation circuit 106 may include circuits 168, 179, 166, 171, 167 represented in FIG. 6 of the U.S. Pat. No. 4,115,662 and, possibly, circuits 173 and 174 of that same Figure.

The output of buffer memory 105 is connected to the input of a switching circuit 107 which may be activated by a connection 108 coming from validation circuit 106. The output of switch 107 is connected to a juncture 62, of the type of juncture 70 in FIG. 3, which is connected to the subscribers data terminal equipment 63 (FIG. 1). One wire of juncture 62 is connected to the input of a counter 109 which counts the octets transmitted by switch 107, and the output of which is connected to the input of a comparing device 110. The other input of switch 107 is connected to the output of format register 104, and the output of which is connected to the inhibiting input of circuit 107. Finally, the output of octet counter 102 is connected to a validation input of circuit 107.

Counter 102 activates its output when it reaches the Nmax count. At that time, buffer memory 105 has received Nmax octets of which possibly only P data packet octets are valid, P representing the total length of the packet. Assuming that circuit 106 validates the packet, as soon as counter 102 validates its output, the octets may be transferred from buffer memory 105 to output 62 through switch 107. As soon as P octets have thus been transferred, the two inputs of comparing device 110 have the same values, and the output of 110 forbids any other transmission from memory 105 to output 62, for the television line under consideration which serves as support to the data packet.

In the circuit in FIG. 5, the Hamming correction circuit is a conventional circuit which will not be described, while transcoding circuit 191 makes it possible, from bits b2, b4, b6 and b8 of the format octet, to find the real length of the block, which is transmitted to format register 104. As an example, circuit 191 may be provided for in the form indicated in FIG. 6.

In the "transcoder" circuit 191 in FIG. 6, the intake wires b2, b4, b6 and b8 transmit the four binary elements delivered by the Hamming correction circuit 190, in the increasing order of the weights. The input wire b8 is connected, on one side to the input of an inverter 192 the output of which is connected to an input of a NOR gate 193 the output of which delivers a signal of the value $2^5$ or 0 on wire $a^5$ and, on the other side, to an input of a NAND gate 195, the output of which is connected to an input of a NAND gate 198, the output of which delivers a signal of the value $2^4$ or 0 to wire $a^4$. Input wire b6 is connected on one side to an input of a NOR gate 194, the output of which is connected to the second input of the NAND gate 195, and to the second input of the NOR gate 193 and, on the other side, to an input of an NAND gate 197 the output of which is connected to the second input of NAND gate 198.

The input wire b4 is connected, on one side, to an input of an AND gate 196 the output of which is connected to the second input of the NOR gate 194, to the second input of the NAND gate 197 and to the first input of a three input NOR gate 200, and, on the other side, to the first input of an NOR gate 199, the output of which is connected to the second input of the NOR gate 200, the output of which delivers a signal of value $a^3$ or 0 to wire a3. Input wire b2 is connected, on one side, to the second input of the NAND gate 199 and, finally, to the first input of an NOR gate 201 which delivers a signal of value $a^2$ or 0 to wire a2. Input wire b4 is also connected to an input of an AND gate 202, the output of which is connected to an input of an OR gate 203 which delivers a signal of a value $2^1$ or 0 to the wire a1. Input wire b2 also is connected to the first input of an AND gate 205 the output of which is connected to an input of an OR gate 206 which delivers a signal of a value $2^0$ or 0 to wire a0. Wire b6 also is connected to an input of an NOR gate 204 the output of which is connected, in parallel, to the third input of the NOR gate 200, to the second input of the NOR gate 201, to the second input of the AND gate 202, to the second input of the AND gate 205 and to the input of an inverter 209. The output of inverter 209 is connected to the first inputs of two AND gates 207 and 208. The output of gate 207 is connected to the second input of the OR gate 203 and the output of the gate 208 is connected to the second input of OR gate 206. The second inputs of AND gates 207 and 208 are respectively connected to two governing wires a and b.

The values of the outputs a5 to a0 are added in adding device 210 before being applied to circuit 104.

It seems that with the following 'truth' Table:

| a | b | |
|---|---|---|
| 0 | 0 | list 1 |
| 0 | 1 | list 2 |
| 1 | 0 | list 3 |
| 1 | 1 | list 4 | in which a and b represent the binary elements which may be applied to terminals a and b by the users of the receiver, transcoding of bits b8, b6, b4 and b2 by transducer 191 gives the results indicated in the foregoing Table.

It must be noted that transcoding essentially bears on the obtaining of signals in list 1, considering that those of list 2 are deduced from them through the adding of one unit to the numbers starting from 0100, then those of list 3 through adding two units and, finally, those of list 4 through adding three units. With respect to the means used in the circuit in FIG. 6, it must be noted that, in order to obtain the last three lists, it is sufficient to add to the means necessary to obtain list 1, the two AND gates 207 and 208, plus inverter 209.

If there is again considered the prefix of a data packet, it appears that the choice of the list must be agreed upon in advance between the operator of the broadcasting transmitter and the subscribing users. It is sufficient to that end to make known, by a wide broadcast subscribing means: newspaper or televised summary, the a, b code to be formed by each user, for example by means of keys on the selector keyboard of the subscriber's apparatus.

In addition, it will be noted that, in the prefix, the continuity index, when same exists, must also occupy only one service octet, thus implying, if there is desired the possibility of correcting a transmission error on a binary element, that the numbering of the packets runs from 0 to 15, then starts again in a cyclic manner.

It is obvious that the circuit in FIG. 4 represents only one embodiment. In practice, with modern technique, it would be executed, as would the entire coupling device unit, using a micro-processor.

I claim:
1. A system for broadcasting data in the form of data packets sent from a transmitting station; said data packets including numerical data received from at least one of a plurality of incoming paths and combining such data into a format comprising a prefix containing synchronization and path identification code signals, said packet also including a format signal indicating the length of the successive data words which follow the prefix; said system comprising:
    a transmitting station having a plurality coupling means, one coupling means being individually associated with each of said incoming paths;
    common governing means for controlling all of said plurality of coupling means, each of said coupling means having an individual input circuit menas coupled to receive data over the incoming path which is individually associated with the coupling device;
    multiplexing means for preparing said data packets for transmission;
    data memory means individually associated with each of said input circuit means for driving said multiplexing means under control of said common governing means;
    counter means operated at a pre-determined bit clock rate for retaining a memory of the amount of data stored in said data memory;
    means responsive to at least a partial filling of said data memory means as indicated by said counter means for inhibiting the input circuit means associated therewith;
    means responsive to said inhibiting of said input circuit means for connecting said data memory means to the multiplexing means and emptying the data memory means, and for resetting the counter means, the inhibition being removed on the emptying of said memory means;
    a register means having an adjustable maximum capacity for causing said inhibition order to be given when the count of said data again reaches a pre-determined value; and
    a small capacity buffer memory means interposed between said input circuit means and its individually associated data memory means for smoothing the flow of said data into said data memory means, the reading of the data into and out of the buffer memory being governed by a programmer means associated with said coupling means.
2. The system of claim 1 and means for sending the signals which follow the prefix into said buffer memory when said prefix is accepted;
    transcoding circuit means for converting the format signal;
    format signal register means responsive to said transcoding means for storing the format signal of each data packet as it is received,
    means responsive to said counter means reaching a maximum count for emptying data from the buffer memory means and into the output circuit means, the length of the emptying data being limited by the content of said format signal register means.

* * * * *